Nov. 12, 1935. G. G. MORENO 2,020,564

METHOD OF PREPARING FILMS FOR REPRODUCTION IN COLORS

Filed Jan. 22, 1934

Inventor
Gabriel Garcia Moreno
By Lyon & Lyon
Attorneys

UNITED STATES PATENT OFFICE 2,020,564

METHOD OF PREPARING FILMS FOR REPRODUCTION IN COLORS

Gabriel García Moreno, Los Angeles, Calif., assignor, by direct and mesne assignments, to C M C Corporation, New York, N. Y., a corporation of Delaware Application January 22, 1934, Serial No. 707,651

4 Claims. (Cl. 88—16.4)

This invention relates to a simple and effective method of taking motion pictures whereby the resulting negative film is suitable for use in producing either monochromatic (black and white) positive films for normal projection, or in producing positive films bearing photographic images of suitable color value for use in reproducing colored images by the additive process.

Although strip film bearing images in which substantially complementary colors are separately recorded, have been produced heretofore, the methods of producing such films have entailed the use of special cameras, printers, and the like. The present method is distinguishable from the prior processes in that the standard cameras may be used without any alteration whatsoever. The printing operation to which the resulting negatives are subjected is greatly facilitated in accordance with this invention by the use of a mat film, more specifically described hereinafter, which permits and insures the printing of desired, similar, equivalent or isomorphous images (such images being of different color value) in proper relation to one another. Such printing operations, furthermore, may be carried out in any desired manner on existing printing devices, whether they be continuous, intermittent, of the contact type, or optical projection type.

Generally stated, the invention contemplates the use of two negative films with their emulsion sides in substantial contact, one of said films being preferentially sensitive to red or red-orange, whereas the other is preferentially sensitive to blue-green or green. These two emulsions may be generally referred to as the panchromatic and orthochromatic types, respectively.

By the use of these two films in such relation in a standard camera, two isomorphous images are simultaneously recorded on both films so that images identical in form but differing in color value are obtained. The images recorded on orthochromatic film (which is preferably positioned in front, closer to the object being photographed) are suitable for use not only as a source of images bearing the green tones, but also as a source for standard monochromatic positive prints.

After the two negative films have been developed, every other pair of isomorphous images from both films are printed upon a single positive film in juxtaposition. During this printing operation, a matting film having alternate frames substantially opaque, is used, thereby positively insuring the printing of the desired images. The finished positive film bears pairs of isomorphous images, one of the images depicting the blue-green values and the other the red-orange. Consecutive pairs on the finished positive represent alternate images on the original negative films, thereby distinguishing from previous additive films. The resulting positive film, furthermore, is equal in length to the length of either one of the original negative films so that during projection, the linear speed of the finished positive does not differ from the standard projection speed of 24 frames per second.

An object of this invention, therefore, is to disclose and provide a method of producing negatives capable of being used either in the formation of monochromatic positives or of positives suitable for use in an additive color process.

Another object is to disclose and provide a method of combining images of complementary color value from separate negatives onto a single positive, in a ready, simple and facile manner.

A further object of the invention is to disclose and provide a positive film suitable for use in an additive cinematographic process, such positive film bearing images of substantially complementary color value but not exceeding the original negatives in length.

A still further object is to disclose and provide a positive film bearing images of substantially complementary color value for use in additive projection process in which the linear film speed does not exceed the standard projection speed.

These and other objects, uses and advantages of this invention will become apparent to those skilled in the art from the following detailed description of the preferred method of producing the negatives and the finished positive film.

In describing the invention, reference will be had to the appended drawing, in which Fig. 1 diagrammatically illustrates the relationship existing between two negative films during photography.

Figs. 2 and 3 diagrammatically illustrate the developed negatives obtained as a result of the photographic operation.

Fig. 4 diagrammatically illustrates one form which may be assumed by the matting film.

Figures 1, 2, 3, 4, 6:
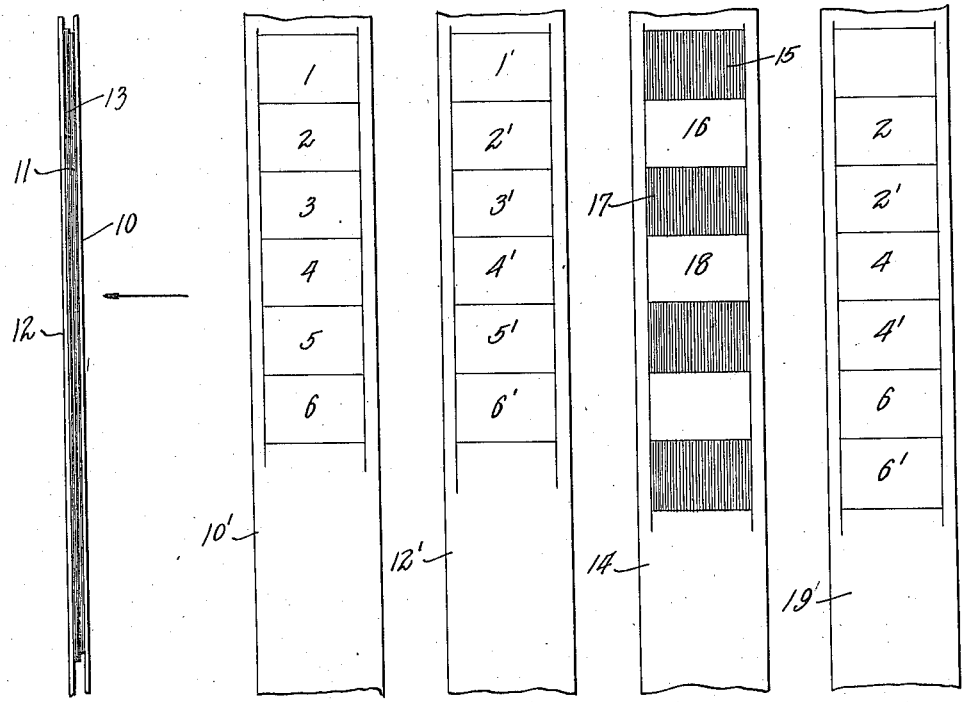
Fig. 6 is a representation of the finished positive film suitable for use in an additive projection process.

As shown in Fig. 1, the camera is loaded with two negative films having their emulsions in substantial contact. Assuming that the light from the camera lens comes from the right, as indicated by the arrow, the front negative 10 may be of the orthochromatic type or preferentially sensitive to green color values. The emulsion is indicated at 11. The rear negative 12 carrying an emulsion indicated at 13 may be of the panchromatic type and preferably what is known as the gray-backed panchromatic film. Such emulsion 13 is preferably sensitive to red color values. The two negatives are exposed to the scenes or objects which it is desired to photograph in a standard camera and in a normal manner. The linear speed of the films passing through the camera is maintained normal, that is, about 24 frames per second. After exposure, the two films are preferably separately developed and fixed, resulting in negatives 10' and 12' indicated in Figs. 2 and 3 respectively. The negative 10' will bear a sequence of images 1, 2, 3, 4, 5, 6. The negative 12' will bear an isomorphous series of images 1', 2', 3', 4', 5', 6', etc. The only difference between images 1 and 1' will be that more of the green tones have been recorded on image 1, whereas the orange-red colors have been more forcibly recorded in the image 1'.

A matting film, indicated in Fig. 4, is then prepared. This matting film 14 has alternate frames thoroughly exposed so as to be substantially opaque. Opaque picture areas are indicated at 15 and 17; substantially transparent picture areas are indicated at 16 and 18.

Figure 5:
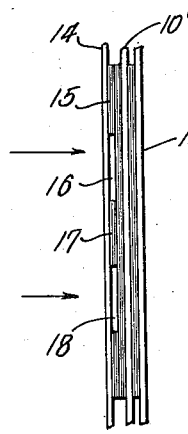
Fig. 5 is a diagrammatic representation of the relationship existing between the matting film, negative and positive during a printing operation.

When it is desired to release an ordinary black and white positive print, the negative 10' is printed in the usual manner upon positive film. By proper regulation of printing light, a positive capable of being projected in the usual manner to form a substantially normal effect of black and white, is obtained. Such positive will bear images 1 to 6, etc. If, however, it is desired to obtain a positive film capable of being used in additive color process, such as that described in a co-pending application filled by Gabriel G. Moreno on November 6, 1933, under Serial No. 696,746, then the mode of operation is as follows:

Every other pair of isomorphous images from both negatives 10' and 12' are printed upon a single positive film in juxtaposition. In order to carry out this printing operation with facility, the negative 10' is placed upon a positive 19, with the emulsion away from film 19 as shown in Fig. 5, and the matting film 14 is placed between the negative 10' and the printing light indicated by the arrow in Fig. 5. The opaque portions 15 and 17 are graphically shown in Fig. 5. These opaque portions 15 and 17 are placed in registration with the picture areas carried by the negative film 10' so that, for example, the opaque portion 15 covers picture area 1, opaque portion 17 covers picture area 3, etc. As a result, during the printing operation illustrated in Fig. 5, only alternate images carried by the film 10' will be printed upon the positive 19 through the transparent portions 16, 18, etc. As a result, the positive film 19 will bear images 2, 4, 6, etc. but will not have the images 1, 3, 5, etc., recorded thereon. At the completion of this printing operation, the negative 10' is removed and the negative 12' substituted therefor. During this second printing operation, the emulsion of the negative 12' is placed in substantial contact with the emulsion of the positive 19 so as to position right and left portions of images in the same manner as the images printed from 10'. The mat film 14 is again placed between the negative 12' and the printing light, the opaque portions 15 again covering the odd images 1', 3', etc., carried by the negative 12'. During this second printing operation, however, the image 2' is placed adjacent the latent image 2 formerly printed upon the positive 19. In other words, the transparent portion 16 of the mat film is immediately above the image 2' and a previously unexposed portion of the positive 19 is immediately beneath the image 2' carried by the film 12'. During this second printing operation, the opaque portion 15 covers the previously printed image 2 impressed upon the positive 19.

At the termination of this second printing operation, the final positive film indicated at 19' in Fig. 6, bears images 2, 2', 4, 4', 6, 6', etc., the pairs of isomorphous images 2 and 2' being in juxtaposition upon the film 19'.

It is apparent that the finished positive film 19' will be of substantially the same length as each of the negatives 10' and 12'. It will bear a record of the action recorded upon the negatives. Adjacent frames of the positive film 19' will consist of isomorphous images from the negatives 10' and 12', one of such images particularly depicting the green color values and the other the red color values.

The positive film 19' thus obtained is then preferably projected by the use of suitable color filters, a pair of images such as the images 4 and 4' being projected simultaneously upon the screen. During such projection, the positive film 19' advances longitudinally at the normal speed, i. e., 24 frames per second, but such longitudinal advance is attained by intermittently moving the film longitudinally a distance of 2 frames at a time (instead of 1 frame as is customary), each pair of isomorphous images being held stationary for two projection periods.

Co-pending application Serial No. 706,839 filed January 16, 1934, describes an improved form of apparatus which may be employed in attaining such modified intermittent motion with minimum mechanical changes to the standard projection apparatus.

Attention is called to the fact that during photography and printing, the operations are carried out in the normal manner and with the usual equipment. The use of the mat film 14 described hereinabove, positively and automatically insures the selection of the required negative images for printing purposes, thereby obviating error.

Although reference has been made hereinabove to the use of orthochromatic and panchromatic film, it is to be understood that the invention is not limited thereto but instead contemplates the use of any two films or emulsions preferentially sensitive to complementary colors. If desired, a suitable color filter or dye may be carried between the two emulsions of the two negative films for the purpose of insuring the recordation of a complementary color by the rear film. In the event the opaque film receives and retains an image of lighter density than the image recorded upon emulsion 11 of the front film 10, the difference in density may be readily corrected by adjusting the printing light during the separate printing operations, so that adjacent images on the resulting positive 19' are of substantially equal density.

In addition to the points of novelty and advantages specifically referred to hereinabove, those skilled in the art will be cognizant of additional uses, advantages and benefits. Although a particular sequence of operations has been described in considerable detail, modifications and changes can be made and all such changes and modifications as come within the scope of the appended claims are embraced thereby.

I claim:

1. A method of producing films for additive color process which comprises photographically recording two consecutive series of images on two strips of film, pairs of images being recorded simultaneously one on each film, said films having their photographic emulsions in substantial contact, one of said emulsions being preferentially sensitive to green and the other preferentially sensitive to red, developing the two films separately, and then printing every other pair of isomorphous images from both films upon a single positive film in juxtaposition.

2. A method of producing films for additive color process which comprises photographically recording two consecutive series of images on two strips of film, pairs of images being recorded simultaneously one on each film, said films having their photographic emulsions in substantial contact, one of said emulsions being preferentially sensitive to green and the other preferentially sensitive to red, developing the two films separately, and then printing every other pair of isomorphous images from both films upon a single positive film in juxtaposition by first printing alternate images from one negative film in spaced relation upon a positive, and then printing isomorphous alternate images from the other negative film into the spaces on said positive so as to have the isomorphous images in adjacent relation.

3. A method of producing films for additive color process which comprises photographically recording two consecutive series of images on two strips of film, pairs of images being recorded simultaneously one on each film, said films having their photographic emulsions in substantial contact, one of said emulsions being preferentially sensitive to green and the other preferentially sensitive to red, developing the two films separately, and then printing every other pair of isomorphous images from both films upon a single positive film in juxtaposition by placing one negative film between a positive film and a masking film having alternate frames substantially opaque, printing alternate images from said negative film upon the positive in spaced relation thereon, and then placing the other negative film between the same positive and a masking film having alternate frames substantially opaque, and then printing images isomorphous to those printed from the first negative into the unexposed spaces on the positive film.

4. A method of producing films for additive color process which comprises photographically recording two consecutive series of images on two strips of film, pairs of images being recorded simultaneously, one on each film, said films having their photographic emulsions in substantial contact, one of said emulsions being preferentially sensitive to green and the other preferentially sensitive to red, developing the two films, and then printing every other pair of isomorphous images from both films upon a single positive film in juxtaposition, the emulsion surface of one of said negative films facing the positive during printing whereas the emulsion of the other negative film faces away from the positive during printing.

GABRIEL GARCÍA MORENO.